(12) United States Patent
Nebendahl

(10) Patent No.: US 6,753,953 B2
(45) Date of Patent: Jun. 22, 2004

(54) SCATTERING ATTENUATOR

(75) Inventor: Bernd Nebendahl, Dtizingen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 275 days.

(21) Appl. No.: 10/002,013

(22) Filed: Oct. 26, 2001

(65) Prior Publication Data

US 2002/0145730 A1 Oct. 10, 2002

(30) Foreign Application Priority Data

Apr. 4, 2001 (EP) .............................................. 01108455

(51) Int. Cl.⁷ ............................................. G01N 21/00
(52) U.S. Cl. .................................................... 356/73.1
(58) Field of Search ................ 356/73.1; 385/139–141, 385/73

(56) References Cited

U.S. PATENT DOCUMENTS 5,087,122 A 2/1992 Ostrander et al. .......... 356/73.1
6,097,873 A * 8/2000 Filas et al. ................... 385/140

FOREIGN PATENT DOCUMENTS

EP 0 341 919 11/1989
WO WO01/08017 A1 2/2001

* cited by examiner

Primary Examiner—Tu T. Nguyen

(57) ABSTRACT

An optical attenuator for attenuating the intensity of an input light beam comprises a scattering element for scattering the input light beam into a range of scattering directions. A beam collecting device is arranged in the range of scattering directions for collecting a portion of the scattered light as an output beam. The attenuation of the output beam with respect to the input light beam is dependent on the portion of the collected light relative to the range of scattering directions. The scattering element is provided with a varying scattering angle distribution in order to control the attenuation.

10 Claims, 1 Drawing Sheet

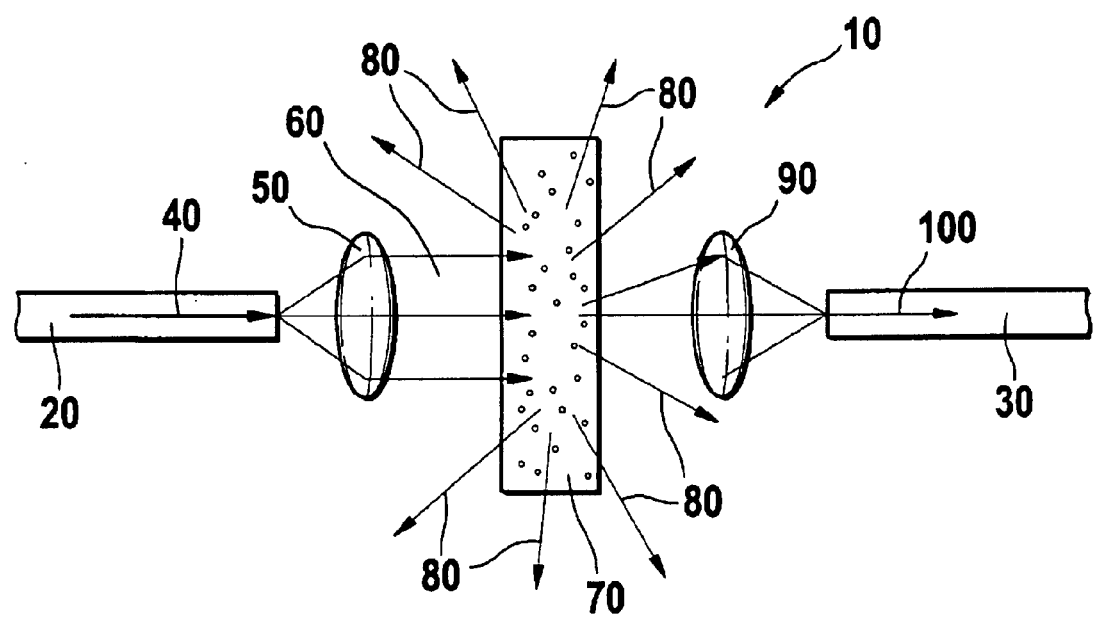

SCATTERING ATTENUATOR

BACKGROUND OF THE INVENTION

The present invention relates to optical attenuators. EP-A-557542 discloses an optical attenuator for attenuating the intensity of a light beam emerging from an optical fiber. The attenuator comprises a wedge-shaped attenuator disk made of an absorbing material and a transparent disk that is also wedge-shaped and fixed to the absorbing disk. For adjusting different attenuations, the attenuator disk together with the transparent disk are rotated around an axis, whereby the thickness of the absorbing material through which the beam passes and thus the attenuation of the beam can be varied continuously. The problem with this solution is that the high local power consumption in the absorbing disk, which leads to heating and eventually destruction on the absorbing disk. Moreover, the attenuation shows a dependency on the wavelength.

U.S. Pat. No. 5,015,057 discloses a polarization insensitive optical attenuator that uses a polymer-dispersed liquid crystal (PDLC) film to provide attenuation control over a wide range of attenuation values. This solution, however, is only applicable in a small temperature range, which renders necessary use of a temperature regulation. Additionally, such PDLC attenuators show a hysteretic behavior, which complicates the control of the attenuation. Moreover, it has been shown that polymers generally do not exhibit sufficient long-term stability due to aging effects. Finally, such PDLC attenuators are not applicable for attenuating high power optical beams.

An adjustable attenuator for optical transmission systems is disclosed in U.S. Pat. No. 5,087,122 and comprises a blocker having a vane-like structure which is gradually rotated into a collimated beam to cause attenuation.

EP-A_341919 discloses a light attenuator comprised of a thermoplastic resin layer in which finely divided particles having light-absorbing or light-scattering property are uniformly incorporated.

SUMMARY OF THE INVENTION

It is an object of the invention to provide an improved optical attenuator for fiber-optical applications. The object is solved by the independent claims. Preferred embodiments are shown by the dependent claims.

According to invention, a substantially parallel optical input beam is directed onto a scattering element of an attenuator. The scattering element scatters the input beam into a range of scattering directions. A beam collecting device, such as a collecting lens, of the attenuator is arranged in the range of scattering directions, and collects a portion of the scattered light as an output beam into an output fiber. The attenuation of the output beam with respect to the input beam is thus dependent on the portion of the collected light relative to the input beam.

The invention thus allows providing optical attenuators for high-power applications. Further more, the wavelength dependency for the provided attenuation can be minimized by selecting the particle size and distribution. Finally, there is virtually no limitation for long-term stability, since heating and thus aging effects can be effectively avoided and the attenuation itself does virtually not depend on the temperature of the scattering material.

In a preferred embodiment, the attenuator is provided with a shielding casing, at least in the range of scattering directions, in order to protect persons and equipment from light beams exciting the attenuator and to shield an output fiber from ambient light.

The scattering element is provided with a varying scattering angle distribution in order to control the attenuation. This can be done e.g. in that a volume scattering element is provided having a wedge-shape as disclosed e.g. by the aforementioned EP-A-55742. This allows controlling the attenuation by means of the effective thickness of the scattering element in the optical path. The scattering element can be provided having disk shape or a longitudinal shape. In the former case, the attenuation can be varied be rotating the disk. In the latter case, the attenuation can be varied be moving the longitudinal scattering element e.g. perpendicular to the input beam.

In another embodiment, the varying scattering angle distribution of the scattering element is provided by a gradient of the density of the scattering particles or by a varying surface scattering angle distribution created for example by chemical etching, photofabrication or sandblasting.

BRIEF DESCRIPTION OF THE DRAWINGS

Other objects and many of the attendant advantages of the present invention will be readily appreciated and become better understood by reference to the following detailed description when considering in connection with the accompanied drawing.

FIG. 1 shows a preferred embodiment of an optical attenuator according to the present invention.

DETAILED DESCRIPTION OF THE INVENTION

In FIG. 1, an optical attenuator 10 is coupled between an input fiber 20 and an output fiber 30. An input light beam 40 from the input fiber 20 is directed via a first lens (or a system of lenses) 50 as a parallel input light beam 60 towards a scattering element 70 of the attenuator 10. The scattering element 70 scatters the parallel input light beam 60 into a range of scattering directions 80. A second lens (or lens system) 90 of the attenuator 10 is arranged to collect a portion of the scattered light, and focuses the collected portion as an output beam 100 into the output fiber 30.

To optimize the performance of the attenuator 10, it is important to choose an appropriate scattering element. For high power applications the scattering element 70 should be non-absorbing which is not necessarily the case for low power applications where the scattering element 70 could be absorbing. Furthermore the wavelength performance can be optimized by selecting the right size or size distribution of the particles or surface structure of the scattering element 70. Finally the polarization dependent loss can be minimized by choosing a surface structure or distribution of particles in the volume which is either random or has a 4-fold symmetry under rotation.

What is claimed is:

1. An optical attenuator for attenuating the intensity of an input light beam, comprising
    a scattering element for scattering the input light beam into a range of scattering directions, and
    a beam collecting device arranged in the range of scattering directions for collecting a portion of the scattered light as an output beam,
    wherein the attenuation of the output beam with respect to the input light beam is dependent on the portion of the collected light relative to the range of scattering directions, and the scattering element is provided with a varying scattering angle distribution in order to control the attenuation.

2. The optical attenuator of claim 1, further comprising a beam distributor for providing the input light beam as a substantially parallel beam to the scattering element.

3. The optical attenuator of claim 1, wherein particle size and distribution are selected for minimizing wavelength dependency.

4. The optical attenuator of claim 1, further comprising a shielding casing, at least in the range of scattering directions.

5. The optical attenuator of claim 1, wherein the scattering element has a wedge-shape.

6. The optical attenuator of claim 1, further comprising a device for moving the scattering element in order to vary the attenuation.

7. The optical attenuator of claim 1, wherein the scattering element comprises a gradient of density of scattering particles.

8. The optical attenuator of claim 1, wherein the effective thickness of the scattering element is varied in the optical path.

9. The optical attenuator of claim 1, wherein the scattering element comprises a varying surface scattering angle distribution.

10. A method for attenuating the intensity of an input light beam, comprising:

scattering the input light beam into a range of scattering directions, varying scattering angle distribution in order to control the attenuation, and collecting a portion of the scattered light as an output beam.

* * * * *